(12) United States Patent
Henry

(10) Patent No.: US 6,587,249 B2
(45) Date of Patent: Jul. 1, 2003

(54) APPARATUS AND METHOD FOR ADJUSTING THE CONTROL SIGNAL OF AN ELECTRO-OPTICAL MODULATOR

(75) Inventor: Michel Henry, Lannion (FR)

(73) Assignee: Corvis Algety SA, Lannion (FR)

( * ) Notice: Subject to any disclaimer, the term of this patent is extended or adjusted under 35 U.S.C. 154(b) by 35 days.

(21) Appl. No.: 10/046,121

(22) Filed: Oct. 24, 2001

(65) Prior Publication Data

US 2002/0060834 A1 May 23, 2002

Related U.S. Application Data

(63) Continuation of application No. PCT/FR00/01110, filed on Apr. 26, 2000.

(30) Foreign Application Priority Data

Apr. 26, 1999 (FR) .............................. 99/05254

(51) Int. Cl.[7] .............................. G02F 1/03; G02F 1/07
(52) U.S. Cl. .......................................... 359/245; 359/315
(58) Field of Search ................. 359/245, 238, 359/315, 239, 276, 321, 322

(56) References Cited

U.S. PATENT DOCUMENTS

| | | | |
|---|---|---|---|
| 3,579,145 A | 5/1971 | DeLange | 359/276 |
| 5,170,274 A | 12/1992 | Kuwata et al. | 359/182 |
| 5,343,324 A | * 8/1994 | Le et al. | 359/184 |
| 5,363,230 A | * 11/1994 | Djupsjobacka | 359/182 |
| 5,394,415 A | * 2/1995 | Zucker et al. | 372/26 |
| 5,764,360 A | * 6/1998 | Meier | 356/486 |

OTHER PUBLICATIONS

Yang, C.R., et al, *Off–level sampling method for bias method for bias stabilisation of electro–optic Mach–Zehnder* modulator, Electronics Letters, vol. 35, No. 7, Apr. 1, 1999, p. 590–591.
*Lithium Niobate Intensity (Amplitude)* Modulator, AT&T Microelectronics, Technical Note, Mar., 1995, pp. 1–20.

* cited by examiner

Primary Examiner—Ricky Mack
Assistant Examiner—Brandi N Thomas

(57) ABSTRACT

The invention provides a method of positioning an electrical control signal (S1, S1bis) for an electro-optical modulator (5) relative to the characteristic (VA, VB) of the modulator (5), in which method a disturbing signal (S2, S2bis) is superposed on the control signal (S1, S1bis) and the position of the control signal (S1, S1bis) is adjusted as a function of the value of a component in the output signal of the modulator (5) corresponding to the applied disturbance (S2, S2bis), in which method the disturbance (S2, S2bis) is superposed on the control signal (S1, S1bis) when the control signal takes a value (VA) that ought to correspond to a minimum slope point (A) of the characteristic, and the positioning of the control signal (S1, S1bis) is adjusted in such a manner as to minimize the amplitude of the disturbance as output due to said disturbance of the control signal (S1, S1bis), the method being characterized in that the characteristic of the modulator (5) includes a second minimum slope point (B) corresponding to a second control level (VB), and in that a second disturbance (S2) is applied to the control signal (S1, S1bis) when it is at said second control level (VB), and in that the positioning of the control signal (S1, S1bis) and the amplitude (Vpi) of the control signal (S1, S1bis) are both adjusted simultaneously so as to minimize each of the two output disturbances due respectively to the disturbances applied at the first and at the second control levels (VA, VB).

15 Claims, 3 Drawing Sheets

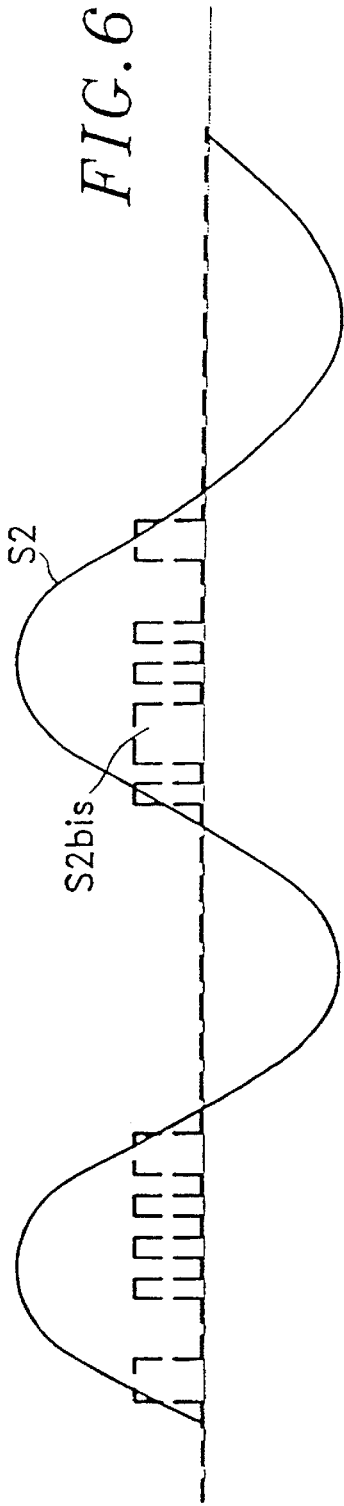
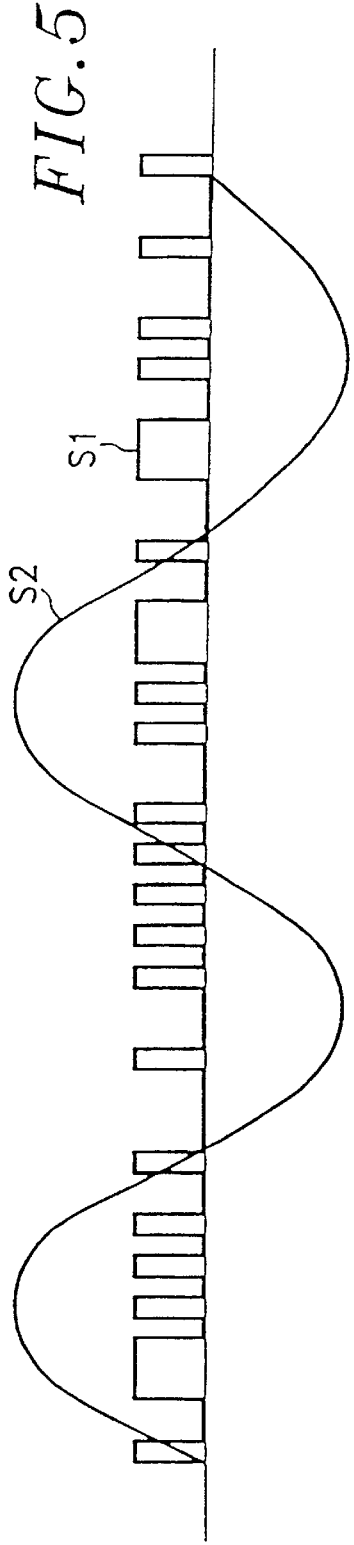
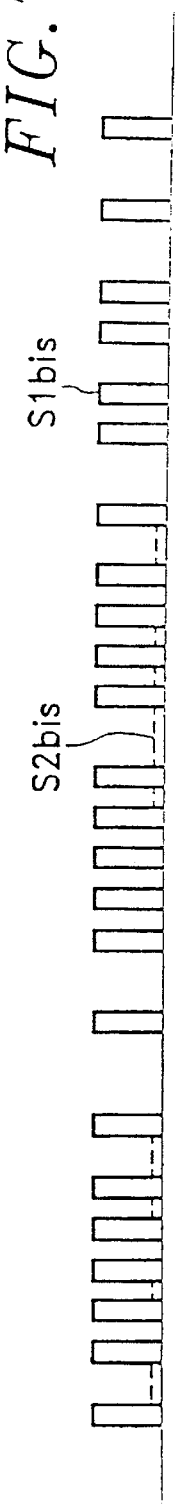

APPARATUS AND METHOD FOR ADJUSTING THE CONTROL SIGNAL OF AN ELECTRO-OPTICAL MODULATOR

CROSS-REFERENCE TO RELATED APPLICATIONS

This application claims priority from PCT application PCT/FR00/01110, filed Apr. 26, 2000, which is based upon French national application 99/05254, filed Apr. 26, 1999.

STATEMENT REGARDING FEDERALLY SPONSORED RESEARCH OR DEVELOPMENT

Not Applicable

The invention relates to apparatus comprising a light emitter (typically a laser diode) operating under steady conditions, and means for modulating the light emitted by the emitter as a function of an electrical signal representing information to be transmitted, typically digital information. Applications for sources of this type lie in particular in the field of optical fiber digital transmission at high bit rates (at greater than 1 gigabit per second (Gbit/s)).

Known modulators present a characteristic of transmitted light power as a function of control voltage which tends to vary over time, thereby affecting the quality of the emitted light signal.

More precisely, this characteristic tends to shift relative to the control voltage so that it becomes necessary to adapt the control voltage regularly as a function of these shifts.

The invention relates to means for compensating such drifts, both for an optical signal of conventional non-return-to-zero (NRZ) format and for a signal of return-to-zero (RZ) format, which means enable the propagation characteristics of optical fibers to be used advantageously. (An example of an RZ format signal is known under the term "soliton".)

The modulators that are used most often, in particular interferometer type modulators, possess a sinusoidal characteristic of the kind shown in FIG. 1. They can be made on lithium niobate (the usual case) or on a III-V semiconductor suitable for monolithic integration with a laser diode.

In conventional apparatuses, of the kind shown in FIG. 2, an electrical information signal S1 is amplified by a driver 3 and is capacitively coupled to a modulator 5. The control signal is positioned relative to the characteristic of the modulator 5 by means of a DC voltage referred to as a "bias" voltage which is applied to a line 22 and which is added to the amplified control signal. The excursion required in the control voltage to go from transparency (point B of the characteristic in FIG. 1) to extinction (point A of the characteristic) is a few volts. The lightwave at the output from the modulator then has "1" levels at the power PH of point B and "0" levels at the power PL of point A. The ratio PH/PL is the extinction ratio of the light signal, and it is advantageous for this ratio to be as large as possible.

The information signal must therefore have peak-to-peak amplitude equal to the amplitude Vpi of the sinewave. It is therefore desirable to add a bias voltage such that the sum (signal voltage+bias voltage) enables both points A and B of the characteristic to be reached.

Because of the way the control circuit is built, the bias voltage is the mean value of the signal actually applied to the modulator 5.

It should therefore be observed that the optimum bias point depends on the nature of the electrical information signal.

The most usual case is that of a digital signal in which "1s" are represented by pulses having a duration equal to the bit time (100 picoseconds (ps) at 10 Gbit/s), and the signal is then said to have the non-return-to-zero (NRZ) format. An example of such a signal is represented by the upper curve in FIG. 3. If it is assumed that the peak-to-peak amplitude of the control signal is Vpi, and that "0s" and "1s" are equally probable, then the optimum bias point lies in the center of the characteristic (point O in FIG. 1) and the optimum bias voltage is (VA+VB)/2.

When "1s" are represented by a pulse of duration shorter than the bit time, then the signal is said to be of return-to-zero (RZ) format. An example of such a signal is shown by the lower curve in FIG. 3. Under such circumstances, the ratio between the peak-to-peak voltage of the total applied signal over its mean value is different, and the optimum bias point is no longer some remarkable point of the characteristic. For example, for a rectangular RZ pulse of duration equal to half a bit time associated with "1s" and "0s" of equal probability, this voltage would be: (3/4 VA+1/4 VB).

It is thus known that modulators are subject to slow drift having the effect of shifting the characteristic of FIG. 1 in translation parallel to the horizontal axis. The causes of such drift are various and depend on the technology used to make the modulator. For modulators using lithium niobate, drift comes mainly from temperature variations, from charge trapped in the electrode-insulating dielectrics, and, at high light injection, from photorefractive effects.

The bias voltage must be servo-controlled in such a manner that the electrical control signal is constantly positioned optimally relative to the real characteristic.

Various solutions have been proposed to solve this problem of servo-controlling the bias voltage.

A first known method consists in superposing on the bias voltage a small amplitude sinewave signal at a frequency f that is situated below the working spectrum of the information signal. At the output from the modulator, a fraction of the light signal is taken using a coupler and is converted back into an electrical signal by means of a photodetector. Thereafter, the component at the frequency 2f in the detected signal is analyzed. If the modulator is biased to the center of the characteristic (the optimum point for an NRZ signal), then this component is zero since the bias point is a point of inflection. Otherwise, the non-linearity of the characteristic will generate a component at said frequency. Servo-control is thus performed so as to eliminate this component at the frequency 2f. The main drawback of this method is that it is applicable only to NRZ format.

Another solution proposed in U.S. Pat. No. 4,306,142 of 1981 consists in using a coupler which takes a fraction of the optical signal input to the modulator and a second coupler which takes light from its output. The signals are converted into electrical signals by photodetectors and they are analyzed by an electronic system including, in particular, duty ratio detectors (an equal probability RZ signal in which a pulse lasts for half a bit time has a duty ratio of 1/4). Servo-control is applied to ensure that the input and output duty ratios are equal. This principle can be used regardless of the format of the signal, but it nevertheless presents the main drawback of being expensive to implement for an application to transmission at high bit rates: photodetectors and duty ratio detectors are circuits which need to operate at the information rate, and at 10 Gbit/s, this requires expensive technology to be used.

Another solution which is also applicable independently of format is proposed in document U.S. Pat. No. 5,805,328. In that solution, two couplers and two photodetectors are used to measure the mean light powers at the input and at the output of the modulator. Servo-control then consists in keeping the ratio between these two powers constant. In this case the measured magnitudes are mean values and the components used can therefore be made out of low cost technology. The drawbacks of the method are firstly the use of two couplers, giving rise to losses of light power and secondly the fact that the servo-control can become defective, particularly in the event of the information signal having its peak-to-peak amplitude drop below Vpi (as can happen due to a small loss of driver performance). Under such circumstances, in order to compensate for the decrease in output power, the servo-control will tend to increase power during optical "0s" which quickly degrades the performance of the system. It can also be observed that the servo-control has the potential of being inaccurate since it depends on a ratio of two measured magnitudes, so measurement inaccuracies and variations in the measuring electronics as a function of temperature or of component aging will affect the overall behavior of the servo-control.

Servo-control techniques relying on a signal which has a physical reason for becoming zero at the optimum operating point are not subject to this defect.

Proposals have also been made in document U.S. Pat. No. 3,579,145 for a method of stabilizing an optical modulator in which a reference signal is positioned by superposing a disturbance on a minimum of the characteristic of the modulator and by seeking as small as possible an effect of said disturbance on the output signal from the modulator. Nevertheless, that method does not enable the amplitude of the reference signal to be adjusted.

An object of the present invention is to provide a method and apparatus for servo-controlling the bias voltage of an electro-optical modulator and presenting the following characteristics:

being usable for signals in RZ format and also for signals in NRZ format;

being inexpensive to implement since it can be implemented using opto-electronic components, of low frequency grade only;

relying on an error voltage becoming zero and thus being relatively intensive to measurement errors; and ensuring that the modulated light signal has a good extinction ratio.

More generally, an object of the invention is to provide a method and apparatus enabling the position and the amplitude of a control signal for an optical modulator to be adjusted.

According to the invention, this object is achieved by a method of positioning an electrical control signal for an electro-optical modulator relative to the characteristic of the modulator, in which method a disturbing signal is superposed on the control signal and the position of the control signal is adjusted as a function of the value of a component in the output signal of the modulator corresponding to the applied disturbance, in which method the disturbance is superposed on the control signal when the control signal takes a value that ought to correspond to a minimum slope point of the characteristic, and the positioning of the control signal is adjusted in such a manner as to minimize the amplitude of the disturbance as output due to said disturbance of the control signal, the method being characterized in that the characteristic of the modulator includes a second minimum slope point corresponding to a second control level, and in that a second disturbance is applied to the control signal when it is at said second control level, and in that the positioning of the control signal and the amplitude of the control signal are both adjusted simultaneously so as to minimize each of the two output disturbances due respectively to the disturbances applied at the first and at the second control levels.

This object is also achieved by apparatus forming a light source, the apparatus comprising a light emitter and an electro-optical modulator, and also comprising means for superposing a disturbing signal on the control signal of the modulator, means for tapping a light signal output by the modulator and means for adjusting the position of the control signal relative to the characteristic of the modulator as a function of the value of a component in the output signal of the modulator that corresponds to the applied disturbance, the apparatus including means for superposing the disturbance on the control signal when the control signal ought to be at a minimum tangent point of the characteristic, and the means for adjusting positioning are designed to adjust the positioning of the control signal in such a manner as to minimize the amplitude of the disturbance output from the modulator due to said disturbance superposed on the control signal, the apparatus being characterized in that the modulator is such that its characteristic includes a second minimum slope point corresponding to a second control level, and in that the apparatus includes means for applying a second disturbance to the control signal when the control signal is at said second control level, and means for adjusting simultaneously both the positioning of the control signal and the amplitude of the control signal so as to minimize each of the two disturbances as output due respectively to the disturbances applied at the first and second control levels.

In a particular embodiment, the invention also makes it possible to servo-control the gain of the modulator driver. In which case it is advantageous to use an additional component at high frequency.

Other characteristics, objects, and advantages of the invention will appear better on reading the following detailed description made with reference to the accompanying figures, in which:

FIG. 5 is a graph showing a sinewave signal used for producing a disturbance signal and an information signal on which the disturbance is to be superposed;

FIG. 6 is a graph showing the same sinewave signal and the disturbance signal generated therefrom;

FIG. 7 is a graph showing the information signal and the generated disturbance signal;

Figure 4:
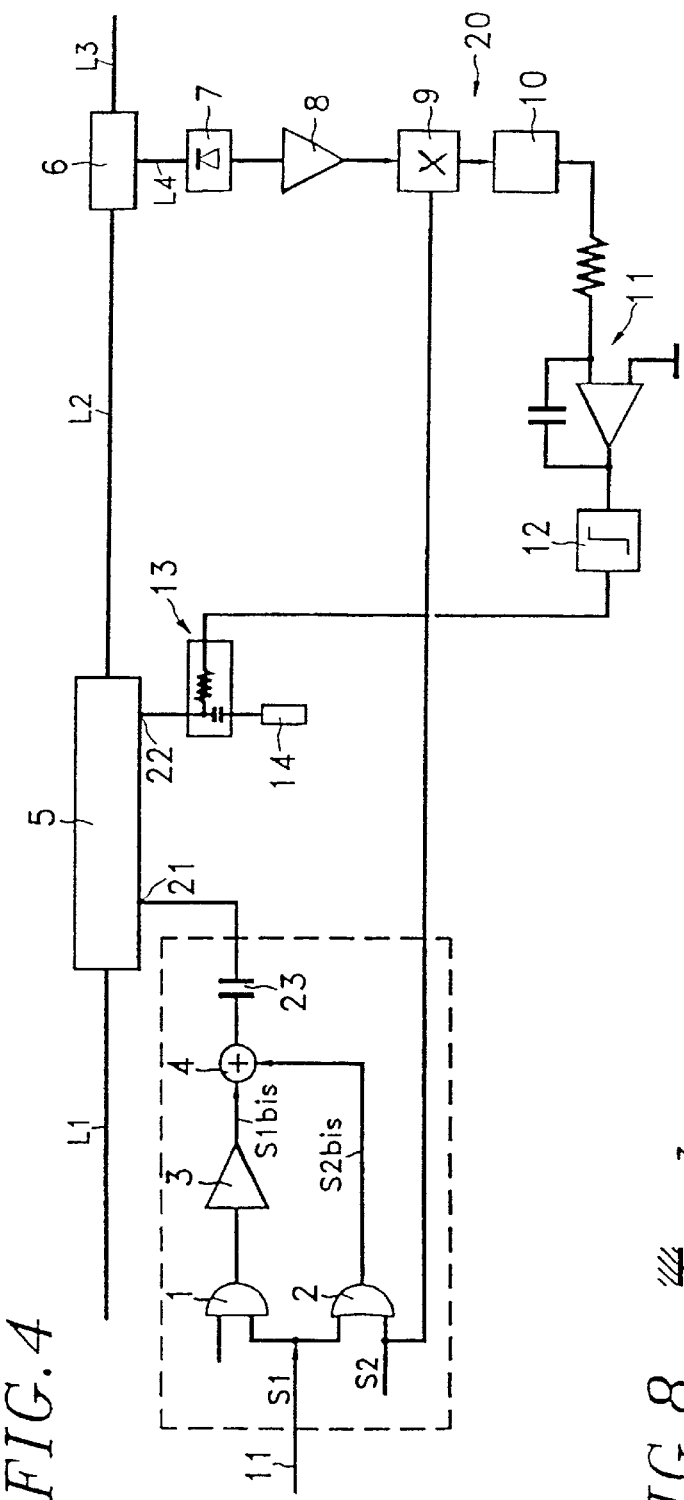
FIG. 4 is a circuit diagram of servo-controlled optical modulation apparatus of the invention.

As shown in FIG. 4, the apparatus of the invention has an electro-optical modulator 5 which receives a lightwave via a lightguide L1 from a continuous light source (not shown, typically a laser diode), and it delivers a modulated lightwave on an output lightguide L2.

The modulator 5 also has two control inputs 21 and 22, the input 21 receiving an electrical control signal and the input 22 receiving the bias voltage. In practice, the inputs 21 and 22 are formed by the ends of a single control electrode of the modulator 5.

A coupler 6 is disposed on the output lightguide L2 to extract a small fraction of the light power output from the modulator 5, leaving the major fraction of the power available on a lightguide L3, for the main utilization.

This signal tapped from the output of the modulator 5 is processed in a servo-control branch 20 looped back on the control input 22 of the modulator. The branch 20 processes the tapped signal, deduces the bias voltage to be applied to the modulator 5 therefrom, and applies the value as deduced in this way to the control input 22.

Between an input 21 of the modulator 5 and a control input 11 of the apparatus as a whole there is placed a preprocessing unit which applies a disturbing signal to the signal S1 which arrives on an input 11, the effects of the disturbing signal at the output of the modulator 5 are analyzed by the branch 20 in order to adjust the bias voltage. This preprocessing unit also transforms the signal S1 so as to convert it from an NRZ signal to an RZ signal.

An electrical modulation signal S1 reaching the input 11 has data represented in NRZ format. An AND gate 1 has a first input receiving the signal S1 and a second input receiving a clock signal at a frequency selected so that the AND gate 1 converts the data signal into an RZ signal.

At this stage the signal has the usual 1 V peak-to-peak level. It is then amplified by an amplifier (or driver) 3 which supplies a signal S1bis having a level of about 6 V peak-to-peak, which is the level generally required for application to present-day modulators.

A summing circuit 4 is placed at the output of the driver 3 to have a first input which receives the signal S1bis and a second input which receives a disturbing signal S2bis.

The disturbing signal S2bis is obtained by means of a NOR gate 2 having one input receiving the information signal S1 and another input receiving a sinewave signal S2 at a frequency f which is selected in this case to be well below the working modulation spectrum of the information signal S1 (for example f can be about 50 kilohertz (kHz)).

FIGS. 5 to 7 show the signals S1, S2, and S2bis. When the information signal S1 is "1", then the effect of the NOR gate 2 is to cause the disturbing signal S2bis to be "0". When the information signal S1 is "0", then the disturbing signal S2bis as output by the NOR gate is either "0" or "1" depending respectively on whether the sinewave S2 of frequency f is in a positive half-cycle or a negative half-cycle.

The disturbing signal S2bis is then added to the information signal S1bis as transformed into RZ format and amplified by the driver 3 by means of the weighted summing circuit 4.

The disturbing signal S2bis is injected with a coefficient of about 1/20, while the coefficient allocated to the signal S1bis is close to unity so that the amplitude of the disturbing signal S2bis is 1/20th that of the information signal S1bis input to the summing circuit 4. In FIG. 4, the signal S2bis is shown at a ratio of 1/2 relative to the signal S1bis for reasons of clarity.

The signal obtained after summing is then injected at the end 21 of the control electrode of the modulator 5 via a coupling capacitor 23 and a low impedance transmission line (generally a 50 ohm ($\Omega$) or 25 $\Omega$ line)

The other end 22 of the electrode is connected to a bias T-connection 13 which enables a DC or slowly varying voltage to be injected constituting the bias voltage of the modulator 5 and which also makes it possible to match the transmission line by means of a load 14.

As described above, a fraction of the output power from the modulator 5 is tapped by a coupler 6 and sent via a lightguide L4 to a photodetector 7 which transforms the light signal into an electrical signal. The signal at the output from the photodetector 7 is amplified by an amplifier 8.

Thereafter the component of this electrical signal that is at the frequency f is detected synchronously by means of a multiplier 9 having a first input which receives the output signal from the amplifier, and a second input which receives the original disturbing sinewave S2.

The output obtained from the multiplier 9 is thus the sum of a DC voltage and a sinewave voltage at the frequency 2f. The DC voltage has a value proportional to the amplitude of the component at the frequency f in the output from the modulator 5, and its sign depends on the difference between the phase of the component at the frequency f in the output and the phase of the sinewave signal S2.

A lowpass filter 10 serves to eliminate the component at the frequency 2f and output by the multiplier 9 so that a DC voltage is obtained at the output from the filter 10.

Since the amplitude of the disturbing signal S2 is small and since this signal is applied only to the point A of the characteristic where the tangent is horizontal, variations obtained in the output from the modulator 5 are practically zero providing the disturbing signal S2bis is properly centered on this point A having a 0 tangent, i.e. providing the zero level of the control signal S1bis is indeed at the voltage where the characteristic is at its minimum.

However, if the level corresponding to the 0 value input to the modulator 5 is offset from the point A of the characteristic, then the disturbances are applied to a portion of the characteristic that is close to the point A but that has a non-zero slope, and as a result these disturbances come through to the output of the modulator 5. The greater the offset between the "0" level of the control signal and point A of the characteristic, the greater the extent to which the disturbances are amplified since the slope of the characteristic increases with increasing distance from the point A.

The amplitude of the DC voltage output from the filter 10 is thus substantially proportional to the difference between the ideal "0" level (point A) and the real "0" level of the control signal.

In addition, depending on whether the "0" level is situated to the right or to the left of point A, the characteristic increases or decreases so that the component at the frequency f in the detected signal is affected by a phase which is negative or positive relative to the phase of the signal S2 which gives rise to a positive or a negative sign respectively for the DC voltage output by the filters. Thus, using this DC signal, the sign of the offset is identified in order to determine a correction direction for the purpose of causing the voltage corresponding to 0 level to converge on the minimum ordinate point of the characteristic.

Depending on whether the bias voltage is situated to the right or to the left of point A, the component at the frequency f in the detected signal will be affected by one phase or by the opposite phase, thus making it possible to obtain the sign of the error voltage and thus ensure that servo-control converges.

This DC voltage indicative of the amplitude and of the direction of the difference between the input voltage level of the "0" point and the voltage of the characteristic corresponding to its minimum power is applied to the input of a comparator-integrator 11 whose output delivers the bias voltage to be applied for the purpose of canceling the error voltage, and this bias voltage is applied to the input 22 of the modulator 5 via a limiter 12.

It should be observed that the servo-control could converge on any point of the characteristic having a horizontal tangent. If the sinewave characteristic of FIG. 1 has some other minimum, e.g. at C, equivalent to A in terms of how the modulator 5 operates, then the point B forming a maximum between the other points must be avoided as a point for the "0" control voltage since that would cause the optical signal to be inverted. In this case, this problem is solved by placing the voltage limiter 12 between the integrator 11 and the input 22 so as to confine the bias voltage within a zone of width narrower than Vpi and containing only one correct operating point and no incorrect point. Given the characteristics of present-day modulators, this limitation imposes no difficulty.

Figure 1:
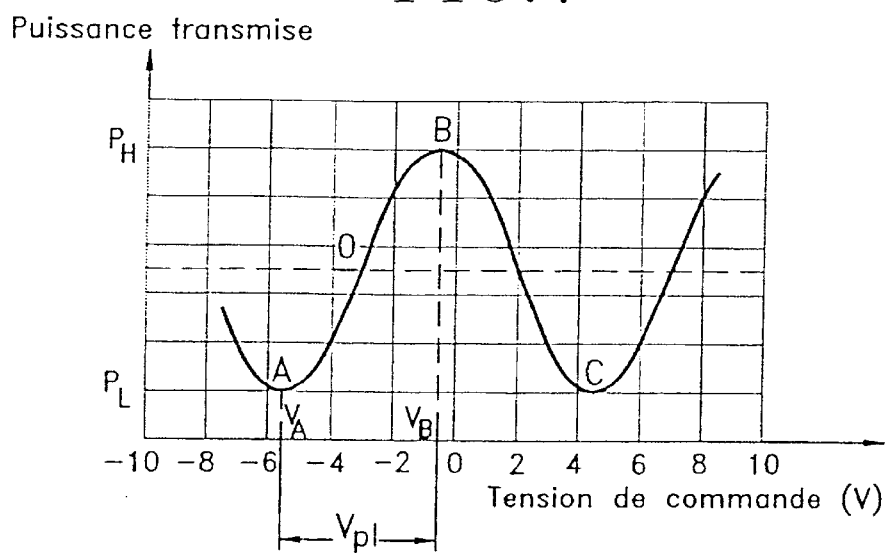
FIG. 1 shows the characteristic of a conventional electro-optical modulator.
Figure 2:
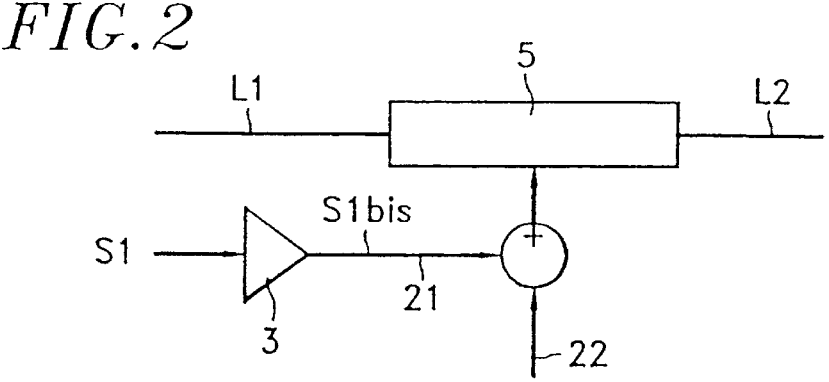
FIG. 2 is a block diagram showing a conventional type of modulator circuit.
Figure 3:
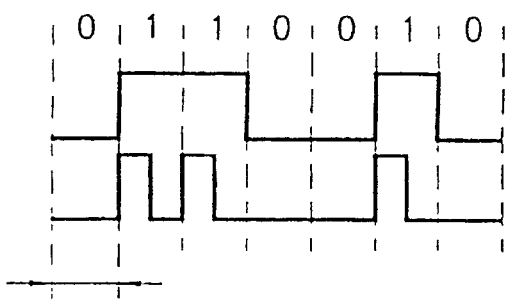
FIG. 3 shows an NRZ type signal and a corresponding RZ type signal.

The servo-control proposed in this example seeks to maintain the level of the optical "0s" in the modulated signal at their minimum value. With reference to FIG. 1, it can thus be seen that the bias voltage must enable the "0" level of the electrical control signal to be positioned on the voltage VA. If the output signal from the driver 3 has the required peak-to-peak amplitude Vpi, then the "1" level will be VB.

A low amplitude disturbing signal is thus superposed in this case on the electrical modulation signal, the disturbing signal being obtained from a low frequency sinewave signal and having the essential feature of affecting electrical "0s" only. At the output from the modulator 5, the disturbing frequency is detected using a method that is responsive to phase.

Operation relies in this case on the fact that the disturbance at the frequency f affects only one control level corresponding to a point having a 0 tangent. Canceling this component in the output of the modulator thus amounts to positioning the electrical "0s" on point A of the characteristic of the modulator, which point presents a horizontal tangent.

This result is acquired regardless of the format of the modulation signal.

In the apparatus operating at the frequency 4, the only high frequency component required is the NOR gate 2 used for generating the disturbing signal S2bis.

Figure 8:
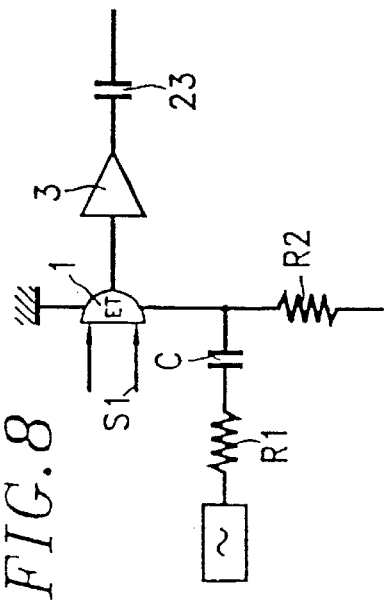
FIG. 8 is a circuit diagram of a module suitable for superposing a disturbance signal on a modulator control signal in accordance with the invention.

In a variant of the invention as shown in FIG. 8, it is possible to avoid using any high frequency component in such a servo-control apparatus. The sinewave signal S2 at frequency f is injected directly in series with a negative power supply voltage for the AND gate 1 that is used for obtaining the RZ format signal in the preceding example.

This signal is injected by means of a passive network of resistors R1 and R2 and a capacitor C. On one of its inputs the network receives a low frequency sinewave voltage and on its other input it receives a negative voltage.

High speed logic circuits such as the circuit constituting the AND gate 1 often have the property of providing a low logic level that depends on the negative power supply voltage, whereas the high logic level does not depend thereon, at least so long as variations are small.

The configuration shown in FIG. 8 thus makes it possible to obtain a signal at the output from the AND gate in which "1" levels are entirely stable whereas "0" levels are disturbed by the sinewave of the frequency f. This signal is thus entirely equivalent to the signal obtained at the output from the summing circuit 4 in FIG. 4.

One possible drawback in this embodiment lies in the disturbance being attenuated by the fact that the driver is operating under saturation conditions, however experience shows that saturation is never perfect, so the disturbance subsists.

When used with a signal in NRZ format, the circuits of FIGS. 4 and 8 continue to be valid, providing the clock is no longer injected to the second input of the AND gate 1. The gate can then be omitted in the circuit of FIG. 4.

The servo-control will converge on a bias point that guarantees an optimum extinction ratio. In the usual circumstance in which the voltage applied to the modulator 5 has a peak-to-peak amplitude equal to Vpi, then an optimum signal will be obtained. If the amplitude of the modulation signal is smaller, then the resulting optical signal will be subjected to distortion in width and in level.

Figure 9:
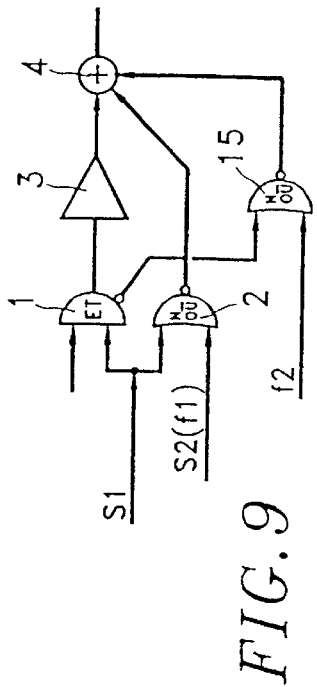
FIG. 9 is a circuit diagram of a module suitable for superposing two disturbance signals of selected values on a modulator control signal, in accordance with the invention.

FIG. 9 shows a variant in which a first disturbing signal is superposed on the control signal when the control signal is at 0 level, and a second disturbing signal is superposed thereon when the control signal is at 1 level, these two disturbing signals being at different frequencies f1 and f2.

Since optimum operation of the modulator 5 requires the control levels "0" and "1" to be situated respectively at points A and B of its characteristic, points where the tangents of the characteristic is horizontal, servo-control which cancels the components at f1 and at f2 in the output that result from the input disturbances will thus enable best performance to be obtained.

Canceling the component at frequency f1 corresponding to positioning the "0" control voltage on the minimum voltage A of the characteristic is performed as described above by adjusting the bias voltage. In the same manner, canceling the component f2 corresponds to setting the "1" control voltage on the maximum B of the characteristic, and this is done by adjusting the gain of the driver 3 by means of a voltage for controlling gain, as is usually available on a component of this type.

Two servo-control loops are thus installed in such apparatus, one controlling the bias voltage on the basis of detection at f1, and the other controlling the width of the voltage range on the basis of detection at f2.

The disturbance at the frequency f1 is obtained as before by means of an AND gate 1 and a NOR gate 2. The disturbance at the frequency f2 applied to the "1" is obtained by using a second NOR gate 15 having one input receiving the sinewave at the frequency f2 and another input receiving the inverted output from the first AND gate 1 so that the signal of frequency f2 is superposed on the input signal of the modulator 5 only when the control signal is at level "1". All three signals are then added together by the summing circuit 4.

What is claimed is:

1. A method of positioning an electrical control signal for an electro-optical modulator relative to the characteristic of the modulator, comprising the steps of:

superimposing a disturbing signal on the control signal; and adjusting the position of the control signal as a function of the value of a component in the output signal of the modulator corresponding to the applied disturbance;

wherein the disturbance is superposed on the control signal when the control signal takes a value that ought to correspond to a minimum slope point of the characteristic;

wherein the positioning of the control signal is adjusted in such a manner as to minimize the amplitude of the disturbance as output due to said disturbance of the control signal;

wherein the characteristic of the modulator includes a second minimum slope point corresponding to a second control level;

wherein a second disturbance is applied to the control signal when it is at said second control level; and wherein the positioning of the control signal and the amplitude of the control signal are both adjusted simultaneously so as to minimize each of the two output disturbances due respectively to the disturbances applied at the first and at the second control levels.

2. The method of claim 1, wherein the two disturbances corresponding to the first and second levels are alternating signals having different frequencies.

3. The method of claim 1, wherein at least one of said disturbances superposed on the control signal is superposed on the control signal solely while it is taking said value corresponding to said corresponding minimum slope point of the characteristic.

4. The method of claim 1, wherein at least one of the minimum slope points of the characteristic is a zero tangent point, and wherein the positioning of the control signal is adjusted so as to cancel the output disturbance due to the disturbance superposed on input corresponding to said point.

5. The method of claim 1, wherein at least one of said disturbances superposed on the control signal is an alternating signal of selected frequency and wherein the amplitude of the component of the output signal having said selected frequency is minimized.

6. The method of claim 1, wherein the frequency of at least one of the selected disturbances is selected to be low relative to the working frequency of the control signal.

7. The method of claim 1, wherein at least one of the disturbances superposed on the control signal is of an amplitude that is low relative to the amplitude of the control signal.

8. The method of claim 5, wherein the output signal is multiplied by an alternating signal at the same frequency as one of the disturbing signals superposed on the control signal in order to obtain a DC signal whose value is representative of the amplitude of the output disturbance due to the disturbance superposed on input.

9. The method of claim 4, wherein one of the minimum slope points of the characteristic is a minimum or a maximum of the characteristic, and wherein the phase difference between the input disturbance and the output disturbance is detected in order to determine the direction of any shift in position between said minimum slope point of the characteristic and the value of the control signal at which the input disturbance is superposed.

10. The method of claim 8, wherein the position of the control signal is adjusted in such a manner as to reduce the value of an integral of said output DC signal to zero.

11. The method of claim 1, wherein one of the two disturbing signals is superposed on a power supply terminal of a logic circuit which has one of its two inputs receiving a modulation control signal.

12. An apparatus forming a light source comprising:

a light emitter;

an electro-optical modulator;

means for superposing a disturbing signal on the control signal of the modulator;

means for tapping a light signal output by the modulator;

means for adjusting the position of the control signal relative to the characteristic of the modulator as a function of the value of a component in the output signal of the modulator that corresponds to the applied disturbance;

means for superposing the disturbance on the control signal when the control signal ought to be at a minimum tangent point of the characteristic;

wherein the means for adjusting positioning are designed to adjust the positioning of the control signal in such a manner as to minimize the amplitude of the disturbance output from the modulator due to said disturbance superposed on the control signal;

wherein the modulator is such that its characteristic includes a second minimum slope point corresponding to a second control level; and wherein the apparatus includes means for applying a second disturbance to the control signal when the control signal is at said second control level; and means for adjusting simultaneously both the positioning of the control signal and the amplitude of the control signal so as to minimize each of the two disturbances as output due respectively to the disturbances applied at the first and second control levels.

13. The apparatus of claim 12, wherein the two disturbances corresponding to the first and second levels are alternating signals at different frequencies.

14. The apparatus of claim 12, wherein the means for superposing at least one of said disturbances on the control signal are designed to superpose said disturbance only when the input signal is at one of said levels designed to correspond to a slope minimum of the characteristic.

15. The apparatus of claim 14, wherein the at least one disturbing signal is an alternating signal at a frequency which is low relative to the working frequencies of the control signal, and wherein the apparatus includes a module receiving the control signal on one of its inputs and an alternating signal on the other of its inputs, and delivering a signal taking the following values:

"0" when the control signal is at a level other than the level at which the disturbance is to be superposed; and "0" or "1" when the control signal is at the control level at which the disturbance is to be superposed, depending on whether the alternating signal is positive or negative; and where the apparatus includes means for adding the signal output by said module to the control signal.

* * * * *